United States Patent Office 2,818,943
Patented Jan. 7, 1958

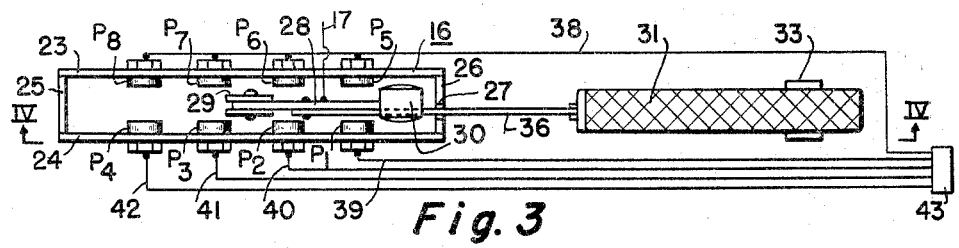
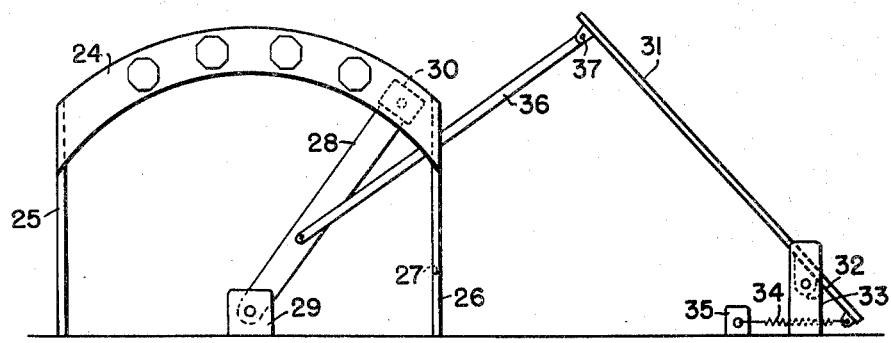
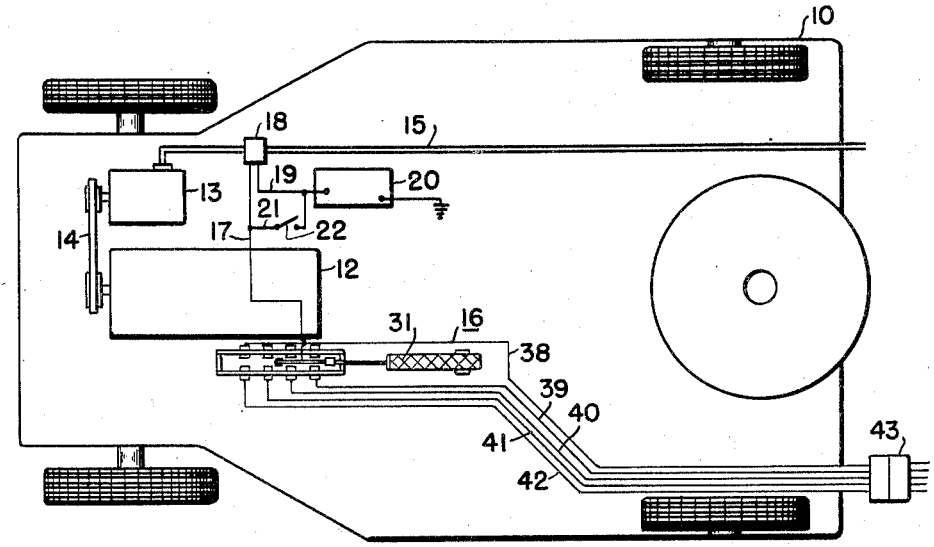

2,818,943

BRAKE SYSTEM

Maynard Campbell Coward, New Kensington, Pa.

Application February 9, 1955, Serial No. 487,051

5 Claims. (Cl. 188—106)

This invention relates to a brake system and, more particularly, to an electrically-operated brake system which may be used as an auxiliary or reserve system in the event of failure of a main system, or used alone as an independent brake system.

Many serious accidents have resulted from failure of a brake system to function. As a safeguard, it has been proposed to use two brake systems on a vehicle such as a truck so that, upon failure of one system, the second or auxiliary system may be used. Such dual systems, however, have not been satisfactory in several respects. Where, for example, two air brake systems are employed, both systems ordinarily are pressurized from the same source. Failure of operation at this source, accordingly, renders not only the main brake system inoperative but the auxiliary system as well. Additionally, some auxiliary brake systems are designed to operate substantially only once and thereafter remain in a locked position. As a result, it is impossible to continue driving the truck or other vehicle to its destination until the auxiliary brakes are released and the main system repaired.

My brake system obviates these faults. When used as an auxiliary brake system, it is entirely independent of the main system. Further, the braking action of the present system can be repeatedly applied so that a truck or other vehicle can still be safely driven even after failure of the main system. In this regard, my brake system can be installed on a vehicle and used as a sole or principal brake system.

In one form, the present brake system includes a hydraulic circuit having one line conventionally adapted to actuate a brake mechanism. Several additional lines branch from this line in parallel connection and rejoin one another, to form a return line for the hydraulic circuit. A pressure-responsive valve and a normally closed valve are included in each parallel line. Each of the pressure-responsive valves opens at a different pressure, and the normally closed valves are placed between the pressure-responsive valves and the line which actuates the brake mechanism. A selector switch opens a desired normally closed valve and simultaneously operates a motor which pressurizes the hydraulic circuit. Accordingly, the hydraulic pressure created in the line which actuates the brake mechanism corresponds substantially to the pressure required to open the pressure-responsive valve contained in the parallel line having the selectively opened valve.

In the preferred form, a by-pass line quickly bleeds the pressure in the hydraulic circuit after operation of the brakes. When the present hydraulic system is used as an auxiliary system, a pressure-responsive switch in the main hydraulic system renders the selector switch operable upon failure of the main system. If it is desired to operate the present brake system independently, the pressure-responsive switch may be short-circuited from a circuit energizing the selector switch, so that the latter is always operable and the present brake system may be continuously used.

The accompanying drawings illustrate a presently preferred embodiment wherein:

Figure 1 and its continuation Figure 2 illustrate a diagrammatic plan view of a truck cab and its trailer which embody the present brake system;

Figure 3 is an enlarged plan view of the selector switch of Figure 1; and

Figure 4 is a section of Figure 3 on the line IV—IV.

Figure 2:
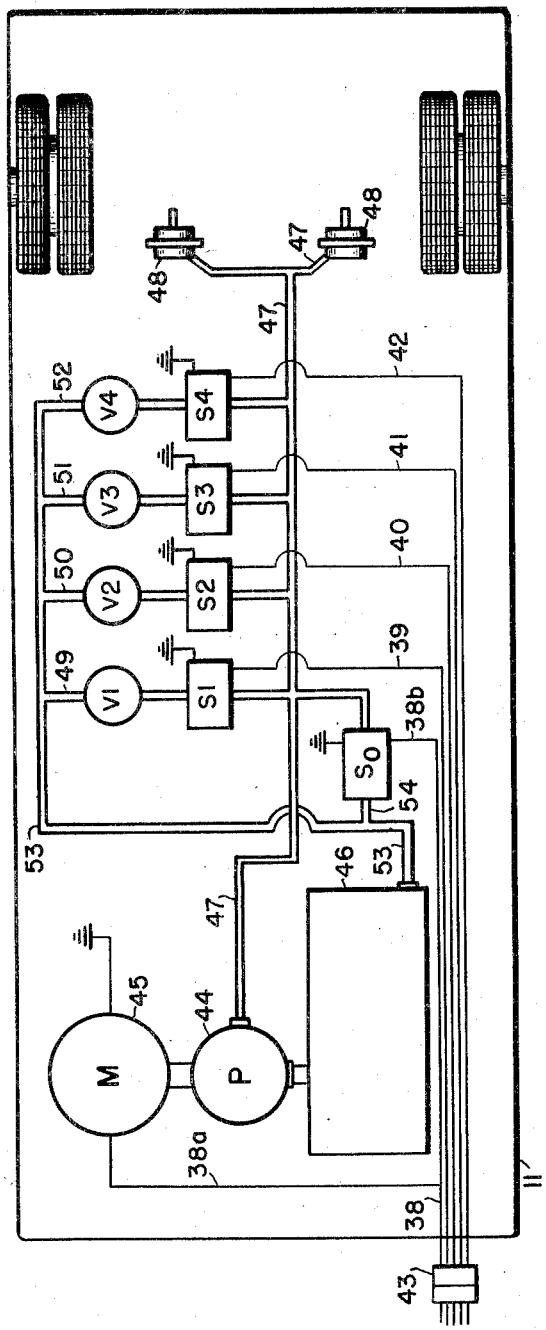

Referring to the drawings, a truck cab and trailer, generally indicated at 10 and 11, respectively, are mechanically connected together in a conventional manner. A motor 12 of the truck cab drives an air compressor 13 by a fan belt 14. The compressor feeds an air line 15 which conventionally operates air brakes in a well-known manner, and therefore such apparatus is not illustrated.

The present brake system is illustrated as an auxiliary system which is used upon failure of the air system of which line 15 is a part, although my brake system may, if desired, be used alone. In the embodiment shown, a selector switch generally represented at 16 has an energizing circuit consisting of conductor 17, a pressure-responsive switch 18, conductor 19, and battery 20 which may be the truck battery. Switch 18 is of the type described in Bulletin 10017 published February, 1954 by Cutler-Hammer, Inc. This switch is normally open but closes when the pressure in line 15 reaches a predetermined minimum. Conductor 21 and manually operated switch 22 are connected in parallel with switch 18 and may be used to short-circuit the latter in order to energize the selector switch 16 regardless of the position of the pressure-responsive switch 18.

The selector switch 16 is preferably mechanically connected to a brake pedal of the truck so that an operator can actuate the present brake system in a usual manner, even after failure of the main brake system. The selector switch includes a pair of non-conducting arcuate plates 23 and 24 supported by end walls 25 and 26, the latter having a vertical slot 27. A plurality of contact stations are spaced along the adjacent sides of the plates. Each contact station includes a pair of opposed contact points, there being eight contact points, $P_1$ through $P_8$, in the embodiment shown. The contact points extend through the plates to suitable connections hereinafter described. An electroconducting lever 28, pivotally mounted between brackets 29, carries a contact head 30 adapted to swing between the plates and engage the contact points $P_1$ through $P_8$. A brake pedal 31 is pivotally mounted by lugs 32 to posts 33 and urged to an upright position by a spring 34 fastened to a fixed lug 35. A connecting link 36 is pivoted at one end to brackets 37 on the pedal and at the other end to the lever 28.

Conductor 17 connects to lever 28. Another conductor 38 connects to contact points $P_5$ through $P_8$ and, in the alternative, could as well attach to contact points $P_1$ through $P_4$. Conductors 39, 40, 41, and 42 are respectively connected to contact points $P_1$, $P_2$, $P_3$, and $P_4$. Conductors 38 through 42 extend to the rear of the trailer 11. Accordingly, a quick disconnecting plug 43 is used to break these conductors electrically when the cab is to be mechanically separated from the trailer.

The brake system also includes (Figure 2) a hydraulic circuit comprising a pump 44 driven by an electric motor 45 and a reservoir 46 for the hydraulic fluid. In the specification and claims, the term "line" is taken to mean a tube, pipe, or other conduit for conveying a fluid. The discharge line 47 of the pump is adapted to operate a brake mechanism by the hydraulic pressure of that line in a conventional manner. In the embodiment shown, line 47 connects to chambers 48. Such chambers are well-known in the art and therefore not illustrated in detail. They may, for example, have a pressure-responsive diaphragm fixed to a connecting rod. Moving the diaphragm also moves the rod. The latter operates a lever which actuates suitable braking means. Other pressure-operated braking means can be used as well.

A plurality of lines 49, 50, 51 and 52, preferably corresponding in number to the number of contact stations of the selector switch 16, extend in parallel connection from line 47 and rejoin one another to form a return line 53 which feeds the hydraulic fluid back to the reservoir 46. A pressure-responsive valve or pressure regulator V and a normally closed solenoid valve S are included in each parallel line, the solenoid valve being conected between the valve V and the line 47. In the drawings, the subscripts to the reference characters V and S correspond to the subscripts of the contact points P of the selector switch 16 to which the solenoid valves S are connected. Each of the pressure-responsive valves V opens at a different pressure. For example, valves $V_1$, $V_2$, $V_3$, and $V_4$ may be set to open at a minimum pressure of 1,000; 2,000; 3,000; and 4,000 p. s. i. g., respectively.

A by-pass line 54 directly connects line 47 to the return line 53 and contains a normally opened solenoid valve $S_0$. With respect to the electrical connections, conductor 38 energizes motor 45 through conductor 38a and closes solenoid valve $S_0$ through conductor 38b. Conductors 39, 40, 41, and 42 energize, respectively, the solenoid valves $S_1$, $S_2$, $S_3$, and $S_4$. The battery 20, motor 45, and the solenoid valves are suitably grounded as indicated, for example, to the frame of the truck.

In operation, as long as the pressure in line 15 is above a predetermined minimum, the present brake system will not operate since the energizing circuit for selector switch 16 is open. However, when the pressure in line 15 reaches the predetermined minimum, switch 18 closes and the circuit to the selector switch 16 is completed. Upon depressing pedal 31, the lever 28 pivots counterclockwise (Figure 4), and the contact head 30 initially engages the first contact station which includes the contact points $P_1$ and $P_5$. Conductor 38 from contact point $P_5$ thereby starts motor 45 and closes solenoid valve $S_0$. Simultaneously, conductor 39 from contact point $P_1$ opens solenoid valve $S_1$ and exposes the pressure-responsive valve $V_1$ to the pressure in line 47. As the pressure in this line quickly rises, a braking action is conventionally applied through the chambers 48. When this pressure reaches 1,000 p. s. i. g., in this embodiment, pressure-responsive valve $V_1$ opens, thereby allowing the hydraulic fluid to return to the reservoir 46 through line 53. Should the pressure in line 47 for any reason fall below 1,000 p. s. i. g. at this time, valve $V_1$ closes until such pressure is again established. In this manner, the pressure applied from line 47 is substantially constant. If a greater braking pressure is desired, lever 28 and contact head 30 are moved to the second contact station which includes contact points $P_2$ and $P_6$. Conductor 38 from contact point $P_6$ again operates motor 45 and closes solenoid valve $S_0$, but this time conductor 40 from contact point $P_2$ opens solenoid valve $S_2$ and exposes pressure-responsive valve $V_2$ to the pressure of line 47. Valve $V_2$ requires a greater pressure of 2,000 p. s. i. g. to open, so that the pressure now created in line 47 is of this magnitude. Moving the contact head 30 between the third and fourth contact stations to close circuits through contact points $P_3$ and $P_7$ or through contact points $P_4$ and $P_8$ similarly operates valves $S_3$ and $V_3$ or valves $S_4$ and $V_4$, respectively, to provide braking action of progressively greater pressure.

As soon as the electrical contacts at any of the contact stations is broken, the solenoid valves $S_1$, $S_2$, $S_3$, or $S_4$ are de-energized and immediately close. Solenoid valve $S_0$ is likewise de-energized and opens to bleed quickly the fluid in line 47 to the return line 53 and thereby quickly reduce the pressure in line 47. In this respect, the by-pass line 54 is not critical to the operation of my brake system since the fluid in line 47 would in time leak back to the reservoir. However, the by-pass line is preferably employed to enable quick, repetitive use of the brake system.

It is emphasized that the present brake system is entirely independent of the air system of which line 15 is a part. Accordingly, even after failure of the latter system, a truck or other vehicle having the present brake system can still be driven to its destination and not marooned at the side of a road until help arrives. Likewise, the present brake system does not remain locked in position after use but can be used again and again.

Should it be desired at any time to use the instant brake system independently of the air brake system, switch 22 can be closed to short-circuit the pressure-responsive switch 18. Or the present brake system can be installed on a truck or like vehicle and used as the sole braking system.

While the foregoing disclosure describes a presently preferred embodiment, it is understood that the invention may be practiced in other forms within the scope of the following claims.

I claim:

1. An electrically-operated brake system including a hydraulic circuit comprising a first line adapted to actuate a brake mechanism by the hydraulic pressure in said line, a return line, a plurality of lines connecting in parallel the first line to the return line, a by-pass line directly connecting the first line to the return line, a pump to force fluid through said hydraulic circuit, and a motor to operate the pump, a pressure-responsive valve in each parallel line, each of said valves being adapted to open at a different pressure, a normally closed solenoid valve in each parallel line between said first line and the pressure-responsive valve, a normally open solenoid valve in the by-pass line, a selector switch having a number of contact stations corresponding at least to the number of solenoid valves in the parallel lines, a conductor connecting each contact station to a solenoid valve in one of the parallel lines, a conductor connecting each contact station to said motor and the solenoid valve in the by-pass line, and means to close a circuit at each contact station of the switch whereby closing a circuit at a selected contact station energizes the motor, closes the by-pass solenoid valve, and opens the solenoid valve in the parallel line connected to the selected contact station and thereby creates in said first line of the hydraulic system a pressure substantially equal to the pressure required to open the pressure-responsive valve contained in the parallel line having the solenoid valve so opened.

2. In a pressure-actuated brake system, an auxiliary brake system including a hydraulic circuit comprising a first line adapted to actuate a brake mechanism by the hydraulic pressure in said line, a return line, a plurality of lines connecting in parallel the first line to the return line, means to force fluid through said circuit, a pressure-responsive valve in each parallel line, each of said valves being adapted to open at a different pressure, a solenoid valve in each parallel line between said first line and the pressure-responsive valve, an electrical selector switch to open the solenoid valves selectively, an energizing circuit for said selector switch, and electrical switch means in the energizing circuit adapted to close in response to a predetermined minimum pressure in said pressure-actuated brake system.

3. An auxiliary brake system as claimed in claim 2 wherein the energizing circuit for the selector switch contains a further switch adapted to short-circuit said electrical switch means whereby the auxiliary brake system can be used as an auxiliary brake system upon failure of said pressure-actuated brake system or used as an independent brake system.

4. A brake system including a hydraulic circuit having a first line adapted to actuate a brake mechanism, a plurality of parallel lines branching from said line and rejoining one another to form a return line for the hydraulic circuit, pressure-responsive valve means in each parallel line, each of said valve means being adapted to open at a different pressure, first means in each parallel line to render said valve means operable selectively, an additional line connecting the first line to the return line, a normally open valve in said addtional line, and means to close said valve upon actuation of said first means in each parallel line.

5. A brake system including a hydraulic circuit comprising a first line adapted to actuate a brake mechanism by the hydraulic pressure in said line, a return line, a plurality of lines connecting in parallel the first line to the return line, and means to force fluid through said circuit, a pressure-responsive valve in each parallel line, each of said valves being adapted to open at a different pressure, a solenoid valve in each parallel line between said first line and the pressure-responsive valve, means to open the solenoid valves selectively whereby the hydraulic pressure created in said first line corresponds substantially to the pressure required to open the pressure-responsive valve contained in the parallel line having the opened solenoid valve, and an additional line connecting the first line to the return line, a normally open valve in said further line and means to close said valve upon opening a solenoid valve.

References Cited in the file of this patent
UNITED STATES PATENTS

| | | |
|---|---|---|
| 1,895,965 | Bendix et al. | Jan. 31, 1933 |
| 2,190,120 | Kohler | Feb. 13, 1940 |
| 2,205,647 | Ferris | June 25, 1940 |
| 2,265,800 | Connor et al. | Dec. 9, 1941 |
| 2,374,909 | Williams | May 1, 1945 |
| 2,377,318 | Born et al. | June 5, 1945 |
| 2,387,896 | Giger | Oct. 30, 1945 |
| 2,515,519 | Lawrence et al. | July 18, 1950 |
| 2,680,500 | Jenkins | June 8, 1954 |